United States Patent
Kanning

(10) Patent No.: US 8,104,935 B2
(45) Date of Patent: Jan. 31, 2012

(54) HEADLIGHT SYSTEM AND A METHOD FOR OPERATING A HEADLIGHT SYSTEM

(75) Inventor: Torsten Kanning, Eltville/Erbach (DE)

(73) Assignee: GM Global Technology Operations LLC, Detroit, MI (US)

( * ) Notice: Subject to any disclaimer, the term of this patent is extended or adjusted under 35 U.S.C. 154(b) by 426 days.

(21) Appl. No.: 12/062,241

(22) Filed: Apr. 3, 2008

(65) Prior Publication Data

US 2008/0246594 A1    Oct. 9, 2008

(30) Foreign Application Priority Data

Apr. 5, 2007 (EP) .................................. 07007138

(51) Int. Cl.
*F21S 8/10* (2006.01)
(52) U.S. Cl. ........... 362/465; 362/507; 362/85; 362/538
(58) Field of Classification Search .................. 362/465, 362/507, 538, 85, 249.1, 249.12, 287, 420, 362/427; 367/96, 13
See application file for complete search history.

(56) References Cited

U.S. PATENT DOCUMENTS

| | | | |
|---|---|---|---|
| 6,229,263 B1 | 5/2001 | Izawa | |
| 6,618,323 B2 * | 9/2003 | Kayano et al. ................. | 367/96 |
| 2003/0026407 A1 | 2/2003 | Ernstrom et al. | |
| 2003/0117808 A1 | 6/2003 | Iwamoto et al. | |
| 2005/0117358 A1 | 6/2005 | Fukawa et al. | |
| 2011/0018442 A1 | 1/2011 | Balzer | |

FOREIGN PATENT DOCUMENTS

| | | |
|---|---|---|
| DE | 10002602 A1 | 10/2000 |
| DE | 102004033347 A1 | 5/2005 |
| DE | 102009022637 A1 | 12/2010 |
| DE | 102009030589 A1 | 12/2010 |
| DE | 102009054238 A1 | 5/2011 |
| WO | 2004034183 A | 4/2004 |

OTHER PUBLICATIONS

European Search Report dated Jun. 6, 2007, issued in Application No1 07007138.6.

* cited by examiner

*Primary Examiner* — Sharon Payne
(74) *Attorney, Agent, or Firm* — Ingrassia Fisher & Lorenz, P.C.

(57) ABSTRACT

A method is provided for operating a headlight system in a motor vehicle, wherein the headlights of the headlight system encompass a first operating mode with a first response behavior and a second operating mode with a second response behavior, which is different from the first response behavior. The method includes, but is not limited to the steps of switching from the first operating mode to the second operating mode, rapid change of the response behavior from the first response behavior beyond the second response behavior until a third response behavior is reached, slow reversal of the response behavior from the third response behavior until the second response behavior is reached. A headlight system is also provided that operates in accordance with the method.

15 Claims, 4 Drawing Sheets

HEADLIGHT SYSTEM AND A METHOD FOR OPERATING A HEADLIGHT SYSTEM

CROSS-REFERENCE TO RELATED APPLICATION

This application claims priority to European Patent Application No. 07007138.6, filed Apr. 5, 2007, which is incorporated herein by reference in its entirety.

TECHNICAL FIELD

The invention relates to a method for operating a headlight system in a motor vehicle and here, in particular, in a passenger motor vehicle as well as to such a headlight system.

BACKGROUND

While in earlier motor vehicles the front headlights were rigidly connected to the body of the motor vehicle, most of the modern motor vehicles encompass an adjusting device, with which the front headlights can be adjusted within certain ranges, for example as a function of the payload of the motor vehicle (lighting range control), of its driving direction (curve lighting adaptation), etc. Overall, this system increases the driving safety. In addition, there are also headlight systems, which are to adapt the adjustment of the headlights according to the driving style of the driver of the motor vehicle.

The so-called AFL-headlight system, wherein AFL stands for "adaptive forward lighting", for example, is such a headlight system, which has an adjusting device for adjusting the headlights. The term AFL identifies front headlights for motor vehicles, the light of which adapts itself to the respective driving situation. Such AFL headlight systems exist in a plurality of different embodiments and variants, which, for the most part, differ from one another for the different vehicle manufacturers. The invention as well as the problems on which the invention is based will be described below with reference to such AFL headlight systems, however without thereby limiting the invention thereto.

The present technological development of headlight systems increasingly deals with adaptive, changeable headlight systems, e.g. for attaining improved visibility conditions in different driving situations as well. The instant invention relates to a headlight system, such as the AFL headlight system, where provision is made for devices for changing the brightness and/or the illumination range, that is, so-called adaptive headlight systems comprising lighting ranges and lighting directions, which can be changed depending on the driving situation and brightness condition. An improved illumination of the curves as compared to normal headlights is attained with AFL headlight systems, for example by means of movable lenses in the headlight. The pivoting of the lenses is controlled by a separate control device, which computes the optimal pivot value for the lenses from speed and steering angle. Typically, AFL headlight systems are equipped with xenon light or, in the alternative, with halogen light as well. In the case of xenon light, the advantage is that, for legal reasons, xenon headlights must already be equipped with a continuous automatic lighting range control and that a control device is required for this. In the case of an AFL headlight system, only the function of said control device must be expanded. As an additional option of AFL headlight systems, provision can be made for a specific direction indicator light, the so-called "cornering", which can be activated in response to slow speeds and when a certain steering angle is reached and/or when a blinker is operates.

Oftentimes, modern motor vehicles have different operating modes. In addition to the normal operation, such operating modes can, e.g., provide for a sports mode, a comfort mode, etc. In the sports mode, for example, provision can be made for the internal combustion engine of the motor vehicle to provide an immediate and thus more rapid response, for a turbocharger or a turbocharger stage to be switched on, for the insulation of the shock absorbers to be adjusted to be harder, for the underbody to be balanced to be harder, for the brakes to grip stronger and the like. If required, the driver of the motor vehicle can activate this sports mode for example by means of a switch or by means of a button. In response to the activation of this operating mode, it is important that the driver of the motor vehicle perceives at least a noticeable change in the behavior of the motor vehicle. This subjective sensation consists of acoustic, optical and other perceptions.

In the case of the optical perception when the sports mode is switched on, there is a need for the driver of the motor vehicle to recognize this switchover at least in a change of the perception of the light emitted by the front headlights. If he recognizes this, this switchover from normal operation to a sports operation will seem to make sense to him from an optical aspect and he will also associate this with a sportive operation.

If motor vehicles are equipped with a device for adjusting the headlights, as this is the case with an AFL headlight system, this AFL headlight system can be included for the switchover to the sports operation. For the sports operation, the headlights are thereby changed by means of the adjusting device of the AFL headlight system in such a manner that the driver of the motor vehicle can effectively recognize a "nervous" behavior of the headlights. To be able to ensure this "nervous" behavior of the headlights, the headlight system is adjusted in such a manner that the headlights respond more immediately. The driver of the motor vehicle will immediately associate this "nervous" behavior of the headlights with a sportier, slightly more aggressive driving behavior, which is inherent to the sports operation.

It is problematic, however, that for illumination purposes of the headlights, it is not recommended to adjust a large response behavior of the headlights and to thus design the reaction of the headlights to be too aggressive, that is, it is necessary here for the headlights not to show a "nervous" behavior, if possible.

Two opposite demands are thus conflicting, namely on the one hand, the high response behavior of the headlights required for marketing-technical reasons for example and, on the other hand, the response behavior of the headlights required for illumination purposes, which should be as low as possible.

Against this background, it is at least one object of the instant invention to specify a headlight system and a behavior for the operation thereof, which enable an improved perceptibility of the operating modes in response to a switchover and yet a safe mode of operation for a motor vehicle comprising a plurality of adjustable operating modes. In addition, other objects, desirable features and characteristics of the present invention will become apparent from the subsequent summary, detailed description, and the appended claims, taken in conjunction with the accompanying drawings and this background.

SUMMARY

According to one or more embodiments of the invention, this object and other objects are solved by means of a method for operating a headlight system comprising the steps of providing a headlight, which can be operated in a first operating mode with a first response behavior and in a second operating mode with a second response behavior, which is different from the first response behavior, wherein one of the first and second operating modes identifies a normal operating mode or a comfort operating mode and the respective other operating mode identifies a sports operation and wherein the headlight, in a starting position, encompasses a first operating mode. The method also comprises the steps of switching from the first operating mode to the second operating mode, in which, immediately after the switchover, the response behavior is rapidly changed, starting with the first response behavior of the first operating mode beyond the second response behavior of the second operating mode, until a third response behavior is reached, and slow reversal of the response behavior from the third response behavior until the second response behavior for the second operating mode is reached.

According to one or more embodiments of the invention, this object and other objects are also solved by means of a headlight system in a motor vehicle for carrying out a the previously presented method. The headlight system comprising at least one headlight, which can be operated in a first operating mode with a first response behavior and in a second operating mode with a second response behavior, which is different from the first response behavior. The headlight system also comprises a switchover device (19) for altering the operating modes and a control device, which is connected to the switchover device and which controls the headlight system (10) in compliance with the adjusted operating mode.

According thereto, a method for operating a headlight system in a motor vehicle, wherein at least one headlight of the headlight system encompasses a first operating mode with a first response behavior and a second operating mode with a second response behavior, which is different from the first response behavior, comprising the steps: switching from the first operating mode to the second operating mode; rapid change of the response behavior from the first response behavior beyond the second response behavior until a third response behavior is reached; slow reversal of the response behavior from the third response behavior until the second response behavior is reached.

A headlight system in a motor vehicle for carrying out the method of an embodiment comprising at least one headlight, which can be operated in a first operating mode with a first response behavior and in a second operating mode with a second response behavior, which is different from the first response behavior, comprising a switchover device for activating and/or switching over the operating mode, comprising a control device, which is connected to the switchover device and which controls the headlight system in compliance with the adjusted operating method.

The recognition on which the instant invention is based is that, in response to a switchover from an operating mode to the next operating mode, the driver of the motor vehicle presumably has barely any or almost no perception of the resulting impacts on the headlight system, so that the effect of such a switchover functionality virtually deflagrates, at least from an optical point of view. This is disadvantageous at least for marketing-technical reasons, but also for sales-engineering reasons, because the potential group of buyers of a motor vehicle comprising such functionality also wants corresponding visible proof for such an additional feature.

The idea on which the instant invention is based is, in response to a switchover from a first operating mode to a second operating mode, to overcontrol the resulting changes of the response behavior of the headlights to a certain extent and to thus make them more comprehensible and more recognizable for the driver of the motor vehicle. This means that, in response to a switchover process from an operating mode to the next, for example in response to a switchover from a normal operating mode to a sports mode, the response behavior of the headlights is considerably increased beyond the response behavior of the headlights, which is provided for the sports mode so that this also becomes visible for the driver of the motor vehicle. In so doing, the desired perception for the driver of the motor vehicle is attained. After a predetermined time period, which can be embodied to be longer or shorter, the very high response behavior is again reduced successively until the response behavior has reached a mean value provided for a sports mode. It is also possible for the response behavior to return to the output value, thus to the value for the normal operation. For example, this time can be chosen to be such that, from experience, the driver turns his attention back to other characteristics of the motor vehicle as well as to his driving environment after this time period. When dimensioning this time period, empirical values can be accessed. It is important hereby that this decrease of the response behavior is carried out very slowly and at least considerably slower than the increase of the response behavior in response to the switchover to the sports mode. This slow decrease is so slow that this decrease of the response behavior can at least not be perceived by the driver of the motor vehicle.

It is important for this switchover process that the response behavior is increased and decreased, respectively, very abruptly, that is, rapidly, so that the driver of the motor vehicle can also perceive this immediately.

Once the response behavior has reached a mean value, which is assigned to the second operating mode, this response behavior remains constant until a switchover takes place back to the first operating mode. This mean value can also correspond to the output value.

The particular advantage of the instant invention is that, on the one hand, the driver of the motor vehicle also immediately recognizes a switchover process from the first to a second operating mode, for example the sports operation, which is particularly advantageous, in particular for marketing and sales-engineering reasons. On the other hand, it is recommended for illuminating purposes not to design the response behavior of the headlights to be too large and thus not to be too aggressive, which is also ensured by the invention after a certain time period. Both of the afore-mentioned demands are thus fulfilled.

In a preferred embodiment, the second response behavior is maintained until a switchover takes place again.

In a preferred embodiment, the third response behavior is maintained between for a predetermined time period, wherein this time period is, in particular, chosen to be so long that the perception of the passengers of the motor vehicle with regard to the response behavior of the headlights decreases within this time.

In a preferred embodiment, the passengers of the motor vehicle can perceive the rapid change of the response behavior from the first response behavior beyond the second response behavior to the third response behavior and the thus associated impacts on the light emitted by the headlights.

In a preferred embodiment, the passengers of the motor vehicle cannot perceive the slow reversal of the response behavior from the third response behavior to the second response behavior and the thus associated impacts on the light emitted by the headlights.

In a preferred embodiment, an operating mode characterizes a normal operating mode or a comfort operating mode and the respective other operating mode characterizes a sports mode.

In a preferred embodiment, the bending function and/or the cornering function are used for adjusting the first and the second response behavior in that the parameters thereof are suitably changed depending on the desired response behavior.

In a preferred embodiment, the change of the response behavior is realized by a change of the control of an actuator of an adjusting device.

In a preferred embodiment, the headlights of the headlight system are held steady in normal operation and vibrate deliberately within a permissible range in sports operation.

In a preferred embodiment, the brightness of the emitted light and/or of the wavelength thereof and/or of the emitted cone of light are changed for adjusting the first and the second response behavior.

In a preferred embodiment, in addition to the headlight system, the switchover also changes the operating method of other functional units, for example the internal combustion engine, the insulation, the underbody.

In a preferred embodiment, the first and second operating mode is in each case operated with dimmed headlights or with driving lights. In the alternative, they can also be operated during the use of the high beam lights.

In a preferred embodiment, provision is made for a controllable adjusting device, which carries out a change of the headlights as a function of the respective response behavior.

In a preferred embodiment, the headlight system encompasses an AFL headlight system.

BRIEF DESCRIPTION OF THE DRAWINGS

The present invention will hereinafter be described in conjunction with the following drawing figures, wherein like numerals denote like elements.

DETAILED DESCRIPTION

Figure 1:
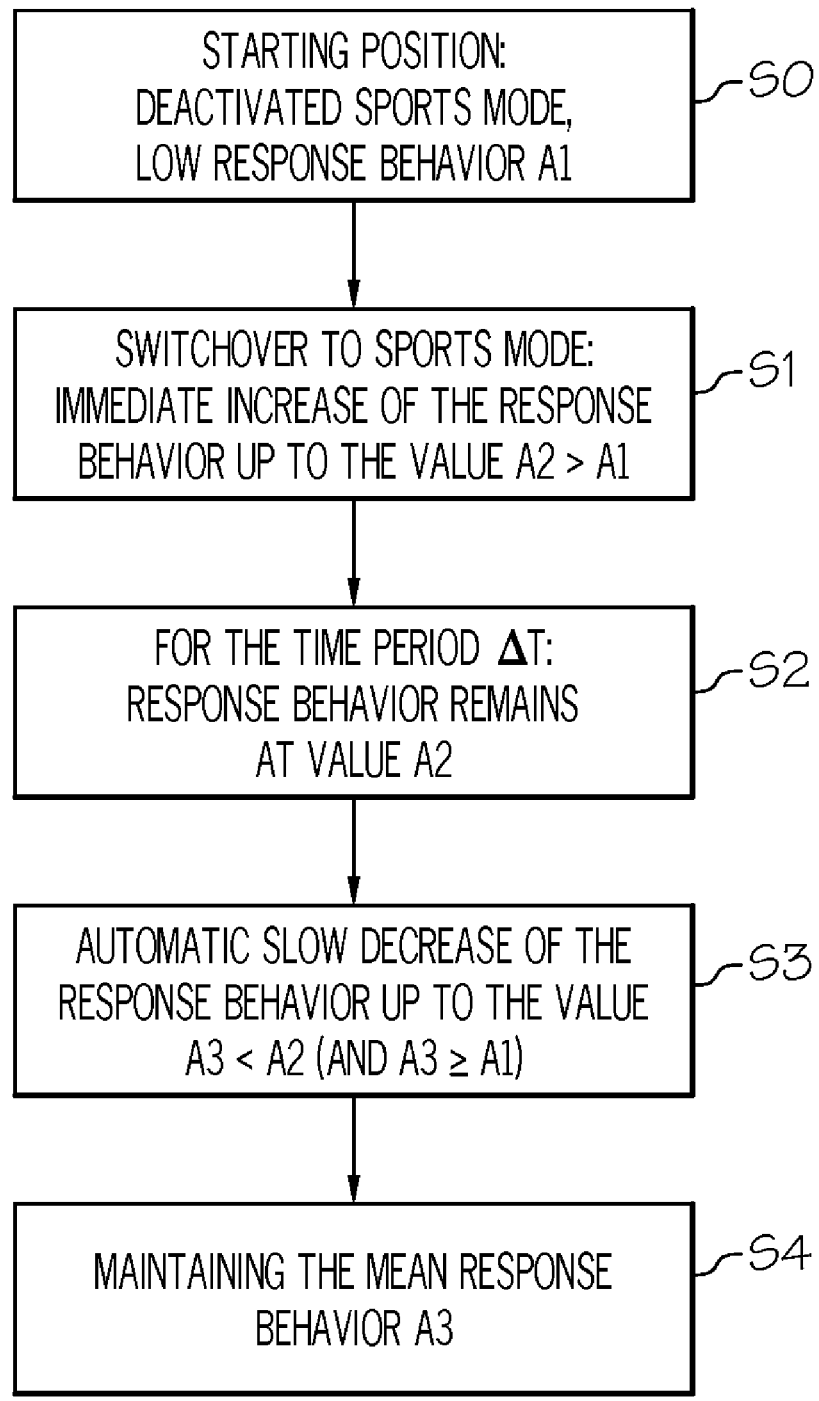
FIG. 1 shows a block diagram for illustrating a first exemplary embodiment of the method.

The following detailed description is merely exemplary in nature and is not intended to limit the invention or the application and uses of the invention. Furthermore, there is no intention to be bound by any theory presented in the preceding background or the following detailed description.

In the figures of the drawing, the same elements and elements, features and signals having the same function, have been identified with the same reference numerals, unless otherwise specified.

A first exemplary embodiment of a method for operating a headlight system will be described below by means of the two FIGS. 1 and 2. According to the first exemplary embodiment of the method, functional units of the motor vehicle are switched from a first operating mode to a second operating mode. The second operating mode thereby identifies, e.g., a so-called sports operating mode, which displays a sportier, more aggressive behavior or which is to at least simulate such a behavior. The first operating mode describes, e.g., a normal operation or comfort operation, with the sports operation thus being deactivated.

Here, provision can be made for the shock absorbers, the internal combustion engine, the turbocharger, the underbody, the headlight system and the like as functional units of the motor vehicle. In the case of a switchover to the sports operating mode, this would mean that the turbocharger, for example, or a stage thereof would be switched on, that the insulation and also the underbody adjustment would be adjusted to be harder, that the internal combustion engine would show an immediate response behavior, etc.

Below, a functional unit is described, which is embodied as a headlight, and to the impact of such a switchover process on the headlights thereof. This will be defined in more detail in FIGS. 1 and 2 at least by means of the first exemplary embodiment. FIG. 1 thereby shows a block diagram for defining the first exemplary embodiment of the method and FIG. 2 shows the corresponding block diagram.

In FIG. 1, S0 identifies the starting position. Here, the motor vehicle and thus the headlight system thereof are in the normal operating mode, with the sports operation thus being deactivated. In this situation, the response behavior A1 is so low that the driver of the motor vehicle does not recognize the response of the headlight as such, that is, for lighting purposes, the headlight ensures a quiet illumination, which is as consistent as possible by means of the headlight. In the case of curve lighting, the headlight thus pivots rather sluggishly and not very abruptly with the curve lighting.

A switchover from normal operation to the sports operation takes place in step S1 at the point T0. An immediate increase of the response behavior is associated with this switchover. The response behavior is thereby increased abruptly, that is, very rapidly, from the low response behavior A1 in normal operation to a high response behavior A2. The driver of the motor vehicle can also recognize this high response behavior A2 immediately. In FIG. 2, the increase of the response behavior in step S1 takes place without a loss of time, wherein it goes without saying that this obviously requires a certain amount of time, which is not illustrated in FIG. 2 herein.

Subsequently, that is in step S3, this high response behavior A2 is initially sustained for a time period ΔT, in which the perception of the driver of the motor vehicle remains directed to this high response behavior. The driver of the motor vehicle immediately associates this high response behavior of the headlights, which he can recognize, with the sports mode, which he himself adjusted in step S1. This high response behavior remains up to the point T1, that is, for the duration ΔT=T1−T0.

Subsequently (step S4), that is, starting from the point T1, a slow, successive decrease of the response behavior of the headlights of the headlight system takes place automatically, that is, without an activation by the driver of the motor vehicle provided specially for this purpose. This slow decrease of the response behavior is dimensioned in such a manner that it cannot be recognized by the driver of the motor vehicle so that he is still under the impression that the sports mode and the high response behavior, which he associates therewith, is still adjusted. This slow lowering is dimensioned in such a manner that the driver of the motor vehicle does not perceive it and that such a consistent, relatively slow decrease of the response behavior and of the corresponding impacts, respectively, cannot be recognized by the driver of the motor vehicle due to habitual effects of the eye. This slow decrease of the response behavior is continued up to the point T2, at which the response behavior has reached a mean value A3. This mean value A3 of the response behavior is thereby dimensioned in such a manner that the response behavior is lower here than the high response behavior A2 and that it is higher or at least the same as the low response behavior A1.

After the point T2, that is, when the mean response behavior A3 has been reached, the response behavior remains at this mean value A3 until a corresponding change of the operating method of the motor vehicle is adjusted.

A second exemplary embodiment of the method will be described below by means of FIGS. 3 and 4. Contrary to the first exemplary embodiment described by means of FIGS. 1 and 2, the sports mode is to be deactivated here, that is, a switchover from the second operating mode back to the first operating mode, that is, to the normal operating mode, is to take place here. The corresponding method takes place herein similarly to the first method.

In the starting position S0', the sports mode is activated, wherein a mean response behavior A3 has been adjusted herein.

At the point T0', the sports mode is deactivated (S1'). An immediate decrease of the response behavior is to take place here, until a very low response behavior A4 is reached. This very low response behavior A4 is at least lower than the low response behavior A1, which is provided for the normal operation. The driver of the motor vehicle can recognize this immediate, abrupt decrease of the response behavior and the impacts on the headlight system connected therewith.

This very low response behavior A4 is also maintained here (step S2') for the time period $\Delta T = T1' - T0'$.

After the point T1' (step S3') has been reached, a slow, successive increase of the response behavior, which the driver of the motor vehicle cannot recognize, takes place until the low response behavior A1, which is assigned to the normal operation, is reached. This is given at the point T2'.

Subsequently (S4'), that is, after the point T2', a low response behavior is adjusted.

Figure 2:
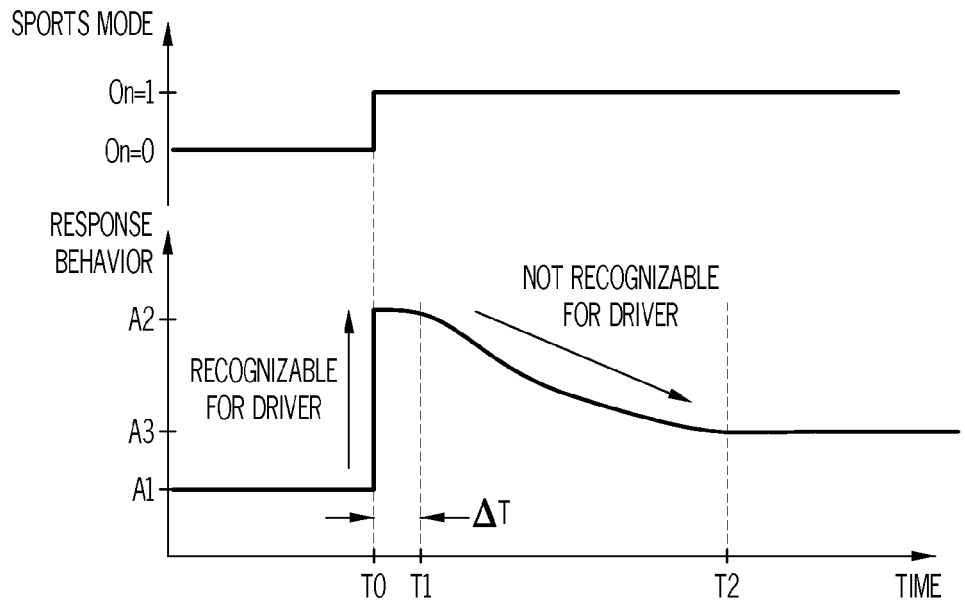
FIG. 2 shows a flow chart for defining the method of the embodiment of FIG. 1.
Figure 4:
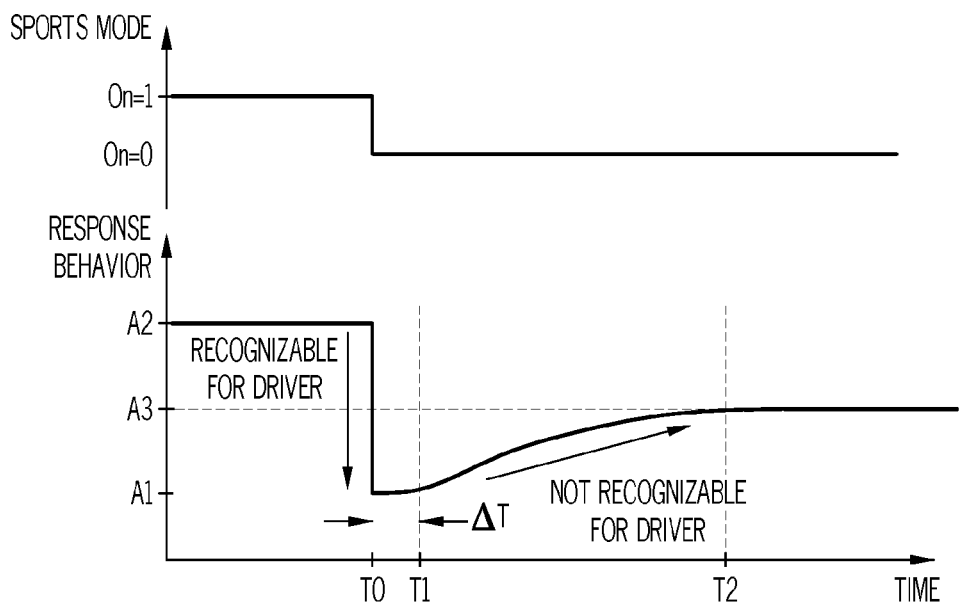
FIG. 4 shows a flow chart for defining the method of the embodiment of FIG. 3.
Figure 3:
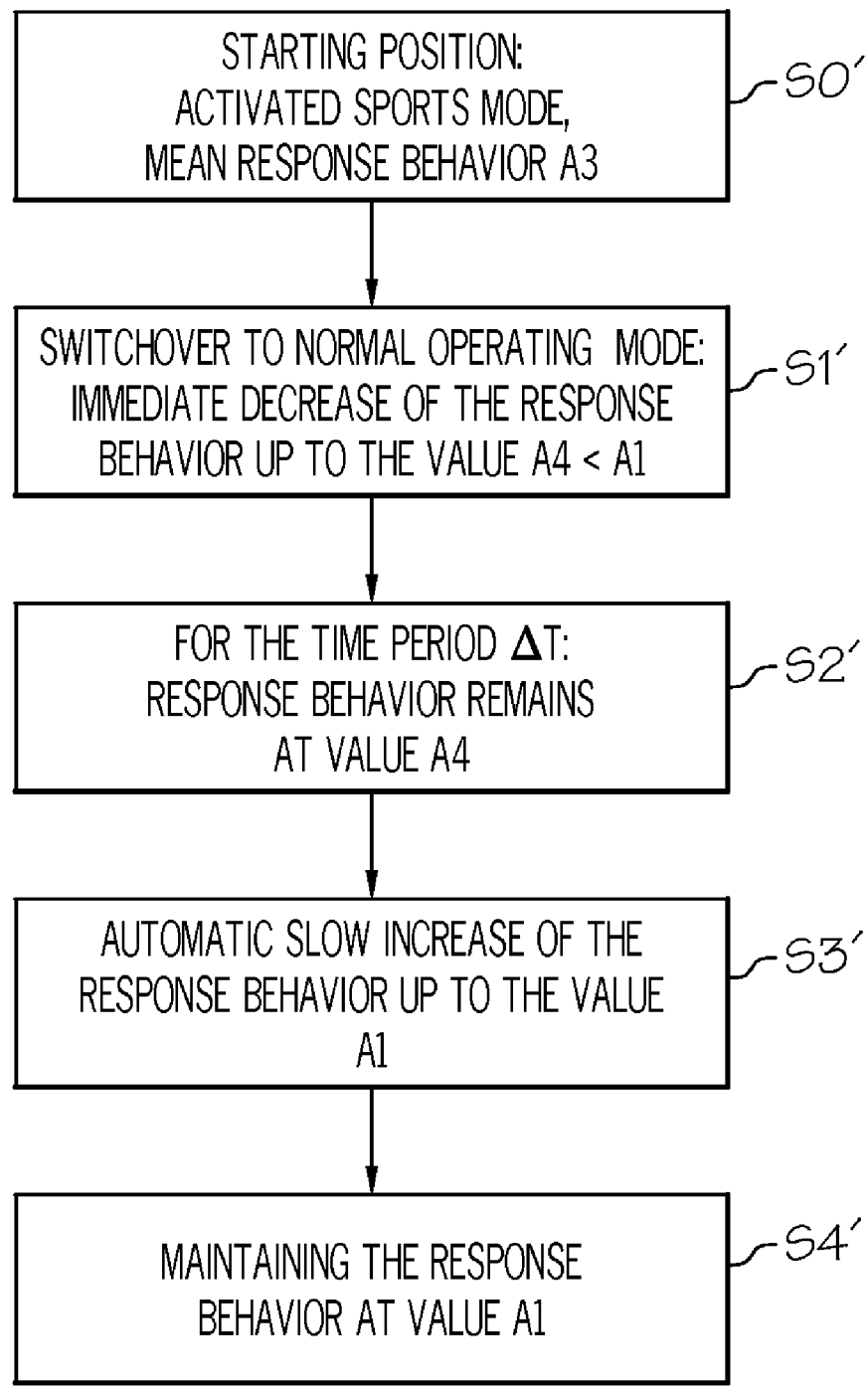
FIG. 3 shows a block diagram for defining a second exemplary embodiment of the method.

At least one aspect of the method, as is described by means of FIGS. 1 and 2 (i.e., first exemplary embodiment) and by means of FIGS. 3 and 4 (i.e., second exemplary embodiment) is that an immediate change of the response behavior to a value A2, A4 is carried out in step S1, S1', the impacts of which on the headlight system are also recognized by the driver of the motor vehicle. This changed response behavior, which is to be recognized by the person of skill in the art, subsequently remains for a certain time period $\Delta T$. It is furthermore important that, subsequent to this time period $\Delta T$ or possibly as early as immediately after the switchover at the point T1, a slow change of the response behavior to such a value, which is provided for the respective desired operating mode and which the driver of the motor vehicle can no longer perceive, is carried out.

For realizing the functionalities of a low and of a high response behavior, provision can be made for a plurality of adjustment of the headlight system, which are to be described below only in an exemplary manner, e.g. not fully and conclusively:

If the headlight system has a so-called bending function for example, a high response behavior can provide, for example, that the light of the headlight is pivoted along with the steering wheel in a very rapid and abrupt manner. This pivoting is realized, by means of a hard coupling of the headlight with the corresponding adjusting device for adjusting the headlights, for example. In the event of a low response behavior, provision is made for a sluggish, rather slow pivoting, which the driver of the motor vehicles also perceives as a more even illumination.

Headlight systems comprising a so-called cornering functionality encompass an additional headlight in the lateral edge region, which can be turned on at a certain steering angle and/or in response to the activation of the blinker and which provides for an improved curve illumination in response to a cornering. In the case of a high response behavior, provision can be made for this steering angle to be smaller, while it is chosen to be rather larger in response to a low response behavior.

Furthermore, provision can also be made for the headlights of the headlight system to be kept even in response to normal operation and to deliberately flicker slightly in sports operation, which is to simulate a certain sporty, aggressive driving behavior. This can be adjusted, for example, by means of the mechanical adjusting device of the headlight system by means of short mechanical impacts against the housing of the lights. It is thus conveyed to the driver that this is also associated with a flickering of the headlights due to a harder adjustment of the underbody and of the insulation.

In response to a high response behavior, it would also be possible for the lights of the headlight to emit a brighter light and/or light comprising a different wavelength as compared to the operating mode with low response behavior. In response to a high response behavior, it would be possible, for example, for very white or for instance also slightly blue light to be emitted, while in response to a low response behavior, light is emitted, which is perceived to be warmer, for example light comprising yellow light wave portions.

In response to a high response behavior, it would furthermore be possible for the light cone emitted by the light to illuminate a wider region, for example a wider angle region, than in response to a low response behavior.

Figure 5:
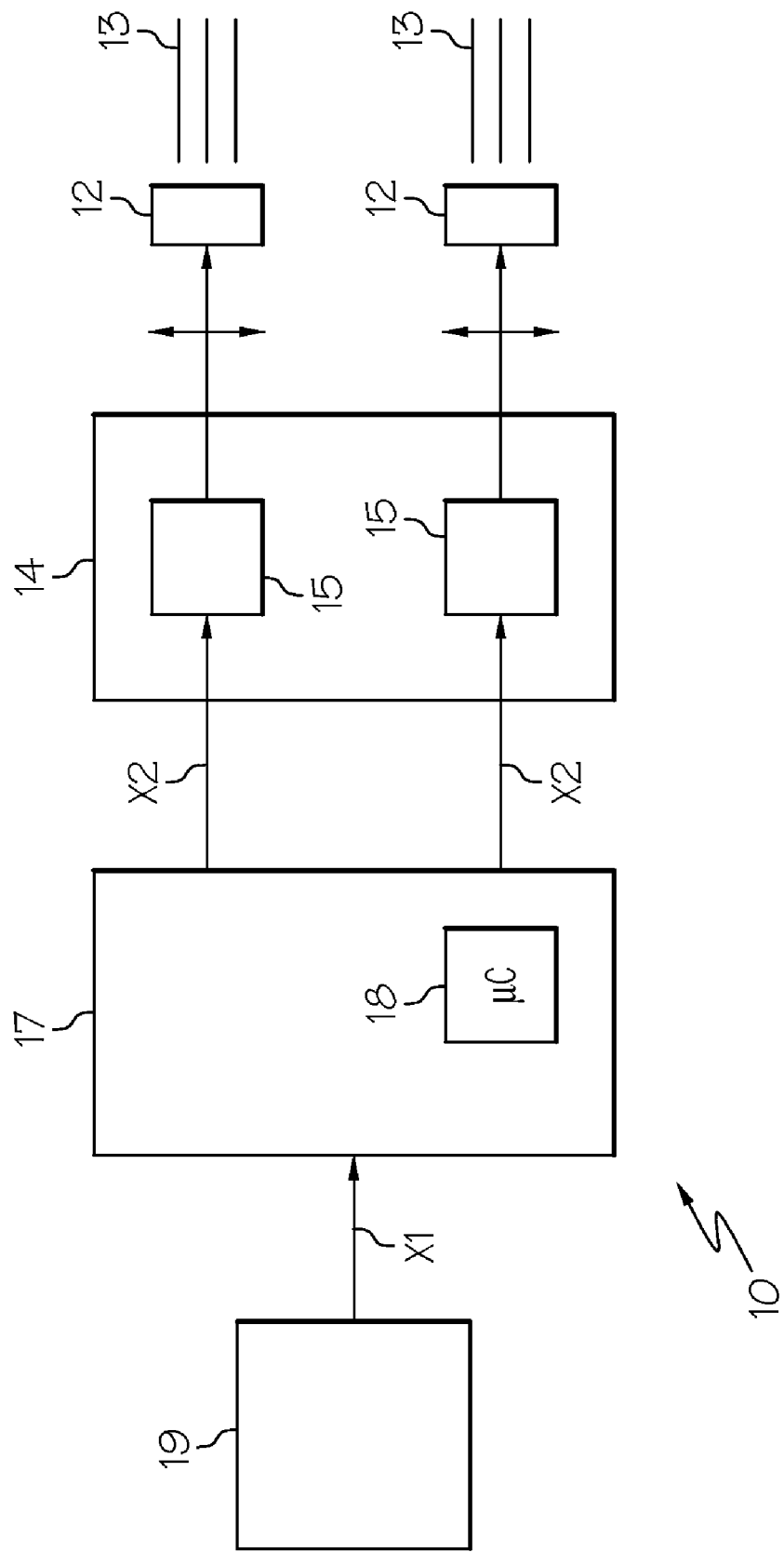
FIG. 5 shows a block diagram for a headlight system of an embodiment.

An exemplary embodiment for a headlight system will be defined below by means of the block diagram in FIG. 5.

The headlight system is identified with reference numeral 10 herein. This headlight system 10 is implemented in a motor vehicle, which is not illustrated herein, and is embodied, as an AFL headlight system as an example. In the instant exemplary embodiment, the headlight system 10 includes two headlights 12. The headlights 12 emit beams of light 13. The headlights 12 are embodied to be adjustable, which is suggested by means of the curved arrows. For adjusting the headlights 12, provision is made for an adjusting device 14. The adjusting device 14 encompasses adjusting units 15. A lighting range control, a curve lighting adjustment, an angle adjustment of the emitted light, etc. can be adjusted by means of this adjusting device 14.

For controlling the adjusting device 14, provision is made for a control device 17. This control device 17 includes a microprocessor 18 and can, e.g., be a component of a control device in the motor vehicle, e.g., of the control device for the light control.

Furthermore, provision is made for a switchover device 19, which is connected to the control device 17. The driver of the motor vehicle or a passenger can adjust at least a first operating mode and a second operating mode of the motor vehicle by means of this switchover device 19. In the event of a switchover of the switchover device 19, this is signaled to the control device 17 by means of a control signal X1. By means of control signals X2, the control device 17 now controls the adjusting device 14 of the headlight system 10, for example by means of a first or second method as set forth in FIGS. 1-4.

Even though the instant invention has been described above with the help of the preferred exemplary embodiments, the invention is not limited thereto but can be modified in a diverse manner.

It goes without saying that the operating method of the headlights of the headlight system can also be separately adjusted, that is, in this case the response behavior of the headlights would not necessarily be coupled to the operating method of other functional units of the motor vehicle, such as, e.g., the internal combustion engine, the insulation, the underbody, etc.

The invention shall thus not necessarily be limited to a headlight system, which is embodied as an AFL headlight system, but can be broadened to any headlight systems.

The invention shall also not necessarily be limited to a passenger car, but can also be used in other motor vehicles, even if this is oftentimes undesired. However, it goes without saying that it would also be possible to advantageously use the invention in motorcycles or other two-wheeled motor vehicles.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

The invention claimed is:

1. A method for operating a headlight system in a motor vehicle, comprising the steps:
    providing a headlight, which can be operated in a first operating mode with a first response behavior and in a second operating mode with a second response behavior, which is different from the first response behavior, wherein one of the operating modes identifies a normal operating mode or a comfort operating mode and the respective other operating mode identifies a sports operation and wherein the headlight, in a starting position, encompasses a first operating mode;
    switching from the first operating mode to the second operating mode, in which, immediately after the switchover, the response behavior is rapidly changed, starting with the first response behavior of the first operating mode beyond the second response behavior of the second operating mode, until a third response behavior is reached;
    reversing the response behavior from the third response behavior until the second response behavior for the second operating mode is reached.

2. The method according to claim 1, wherein the second response behavior is maintained until a switchover takes place again.

3. The method according to claim 1, wherein after reaching the third response behavior, said response behavior is maintained for a predetermined time period, wherein said time period is chosen in particular to last so long that the perception of the passengers of the motor vehicle relating to the current response behavior of the headlights has weakened or is no longer present within this time period.

4. The method according to claim 1 wherein the rapid change of the response behavior and the associated impacts on the light emitted by the headlights cannot be perceived by the passengers of the motor vehicle.

5. The method according to claim 1, wherein the slow reversal of the response behavior from the third response behavior to the second response behavior and the thus associated impacts on the light emitted by the headlights cannot be perceived by the passengers of the motor vehicle.

6. The method according to claim 1, wherein a bending function and/or a cornering function are used for adjusting the first, second and/or third response behavior in that the parameters thereof are suitably changed, depending on the desired response behavior.

7. The method according to claim 1, wherein the change of the response behavior is realized by changing the control of an actuator of an adjusting device of the headlight system.

8. The method according to claim 7, wherein headlights of the headlight system are held steady in normal operation and vibrate deliberately within a permissible range in sports operation.

9. The method according to claim 1, wherein brightness of emitted light is changed for adjusting at least one of the first, second and third response behavior.

10. The method according to claim 1, wherein an operating mode of an internal combustion engine is changed with the switchover of the operating modes.

11. The method according to claim 1, wherein, in response to an adjusted headlight of the motor vehicle, the first and second operating mode are operated together in each case.

12. A headlight system in a motor vehicle, comprising:
    at least one headlight having a first response behavior when the motor vehicle is in a first operating mode, and having a second response behavior, which is different from the first response behavior, when the motor vehicle is in a second operating mode;
    a switchover device for switching over the operating mode;
    a control device, which is connected to the switchover device and which controls the headlight system, wherein immediately after the motor vehicle switches from the first operating modes to the second operating mode, the control device causes the headlight to initially have a third response behavior before gradually shifting to the second response behavior.

13. The headlight system according to claim 12, wherein provision is made for a controllable adjusting device, which carries out a change to the headlights as a function of the respective response behavior.

14. The headlight system according to claim 12, wherein the headlight system is an AFL headlight system.

15. The headlight system according to claim 12, wherein the control device causes, immediately after the motor vehicle switches from the second operating modes to the first operating mode, the headlight to initially have a fourth response behavior before gradually shifting to the first response behavior.

* * * * *